United States Patent
Zhang et al.

(10) Patent No.: US 9,270,022 B2
(45) Date of Patent: Feb. 23, 2016

(54) METHOD, APPARATUS AND SYSTEM OF ANTENNA ARRAY DYNAMIC CONFIGURATION

(75) Inventors: Zhan Zhang, Beijing (CN); Yu Qian, Beijing (CN); Xinghua Song, Beijing (CN); Sven Petersson, Sävedalen (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 988 days.

(21) Appl. No.: 13/383,009

(22) PCT Filed: Nov. 11, 2011

(86) PCT No.: PCT/CN2011/001889
§ 371 (c)(1),
(2), (4) Date: Jan. 9, 2012

(87) PCT Pub. No.: WO2013/067657
PCT Pub. Date: May 16, 2013

(65) Prior Publication Data
US 2013/0120191 A1    May 16, 2013

(51) Int. Cl.
*H01Q 3/00* (2006.01)
*H01Q 3/26* (2006.01)
*H04B 7/04* (2006.01)
*H01Q 21/26* (2006.01)
(Continued)

(52) U.S. Cl.
CPC ............... *H01Q 3/26* (2013.01); *H01Q 21/26* (2013.01); *H04B 7/0408* (2013.01);
(Continued)

(58) Field of Classification Search
CPC ............ H01Q 3/00; H01Q 7/00; H01Q 3/26; H04B 7/086; H04B 7/088; H04B 7/0469; H04B 7/0473; H04W 16/28

USPC .......................................... 342/377, 368, 373
See application file for complete search history.

(56) References Cited

U.S. PATENT DOCUMENTS 7,132,979 B2 * 11/2006 Langenberg .................. 342/368
7,705,797 B2    4/2010 Philippakis
(Continued)

FOREIGN PATENT DOCUMENTS

CN    1398016 A    2/2003
CN    101431357 A    5/2009
(Continued)

OTHER PUBLICATIONS

International Search Report mailed Aug. 23, 2012 in re PCT Application No. PCT/CN2011/001889.
(Continued)

*Primary Examiner* — Harry Liu
(74) *Attorney, Agent, or Firm* — Patents on Demand, P.A.; Brian K. Buchheit; Scott M. Garrett

(57) ABSTRACT

A method (40) of antenna array dynamic configuration for 3-Dimension beamforming in wireless network is provided, comprising: determining (41) dynamically a mapping pattern for transforming a physical antenna array into a virtual antenna array based on time-varying downlink or uplink baseband channel statistics, from a set of candidate mapping patterns; and configuring (42) the physical antenna array as different virtual antenna arrays according to the dynamically determined mapping pattern. The corresponding apparatus, antenna array and wireless base station system are also provided. These are used to improve radio transmission bandwidth communication efficiency.

26 Claims, 4 Drawing Sheets

(51) Int. Cl.
- *H04B 7/06* (2006.01)
- *H04B 7/08* (2006.01)
- *H04W 16/28* (2009.01)

(52) U.S. Cl.
CPC ........... *H04B 7/0452* (2013.01); *H04B 7/0456* (2013.01); *H04B 7/0465* (2013.01); *H04B 7/0469* (2013.01); *H04B 7/0473* (2013.01); *H04B 7/0482* (2013.01); *H04B 7/0617* (2013.01); *H04B 7/0626* (2013.01); *H04B 7/0632* (2013.01); *H04B 7/0639* (2013.01); *H04B 7/0695* (2013.01); *H04B 7/086* (2013.01); *H04B 7/088* (2013.01); *H04B 7/0842* (2013.01); *H04W 16/28* (2013.01)

(56) References Cited

U.S. PATENT DOCUMENTS

| | | | |
|---|---|---|---|
| 2003/0003959 A1* | 1/2003 | Tsui et al. | 455/561 |
| 2006/0093055 A1* | 5/2006 | Goldberg | 375/267 |
| 2010/0064193 A1* | 3/2010 | Huschke et al. | 714/748 |
| 2011/0261773 A1* | 10/2011 | Nogami | 370/329 |

FOREIGN PATENT DOCUMENTS

| | | |
|---|---|---|
| CN | 101438508 A | 5/2009 |
| CN | 101485043 A | 7/2009 |
| CN | 101656971 A | 2/2010 |
| EP | 1227539 A1 | 7/2002 |
| WO | 2010090442 A2 | 8/2010 |

OTHER PUBLICATIONS

Waldschmidt, C., et al., "Spiral and Dipole Antennas for Indoor MIMO-Systems." IEEE Antennas and Wireless Propagation Letters, vol. 1, No. 1, pp. 176-178. Jan. 2002. IEEE, Piscataway, NJ.

3GPP. "Views for DL MIMO operation in LTE-A." 3GPP TSG-RAN WG1 #56. R1-090874. Feb. 2009. 3GPP, Sophia Antipolis, France.

* cited by examiner

METHOD, APPARATUS AND SYSTEM OF ANTENNA ARRAY DYNAMIC CONFIGURATION

TECHNICAL FIELD

The invention generally relates to antennas of radio communications, particularly to a method, an apparatus and a system of antenna array dynamic configuration, especially for 3-Dimension beamforming (3D BF) in various radio communications.

BACKGROUND

In general, 2-dimension beamforming (2D-BF) means having the transmission/reception radio beam(s) formed at different azimuth(s). Though the beam(s) might be of multiple azimuths to same receiver (multi-path) or different receivers (MU), in elevation angle, the beams have a same degree of departure (DoD) or Degree of arrival (DoA).

In contrast, so-called 3-dimension (3D)-BF will direct the beams to certain DoDs or receive the beams from certain DoAs in both azimuth and elevation angles. This might be advantageous where the multiple paths exhibit a wide angle-spread of DoDs or DoAs in elevation so that this characteristic could be exploited to synthesize the transmission signals or analyze the reception signals in the elevation dimension.

The realistic radio propagation and geographic distribution of the transmitters and receivers are truly 3D, diverse, and time-varying. For example, FIG. 1 illustrates current non-uniformality reality of UEs distribution. UEs distribution may vary with the time of a day. Typically, during daytime, people gather in the central business districts while at night time, they come back home in the residential area. UEs' distribution may also relate to different landscape of regions, such as downtown or suburb, etc. Usually, UEs are distributed and clustered in a 3D domain 10 which contains adjacent cells 11, base stations 12, buildings 13 and individual UEs 15; arrows indicate the radio wave radiated by the base station; and UEs' height and azimuth distributions are time-varying and influential to system performance. Therefore, the new generation transceiver and antenna array design has to be of 3D features and dynamic.

However, most of the signals processing methodologies so far are designed separately from the configuration of antenna characteristics, or vice-versa. This can not well adapt to the 3-Dimension and time-varying characteristic of the UEs distribution in the real world, and thus might limit the further efficiency improvement of communications.

The existing planar antenna array has a potential to serve a 3D BF with a refinement. They may need certain RF connection modification or advanced dimension-reduction baseband circuitry network.

SUMMARY

In this document, an improved solution of dynamic configuration of antenna array is designed and proposed to address these issues.

In such a sense, both single antenna or multiple-antennas transmission/reception schemes may have potential to evolve for better performance if they have joint antenna-configuration and base-band signal processing. Further, this joint scheme provides an approach for achieving a well trade-off between system complexity and communication efficiency.

The inventor of the present invention have realized the following aspects useful in next generation transceiver design: i) Dynamic-resolution antenna array for adaptive 3D BF; ii) Mapping pattern switching based on baseband statistics (statistical function of effective channels); and iii) enabling a possibility to apply exactly the same BF algorithm for adaptive 2D/3D BF while exploiting the time-varying spatial features of UE distribution.

Thus, an objective of the invention is to propose a method, an apparatus, and a system of antenna array configuration for facilitating 2D, especially 3D beamforming by feasible dynamic selection of antenna mapping pattern based on statistical base-band signal processing, so as to reflect the UEs distribution in the real scenarios, thus eventually improving radio transmission bandwidth communication efficiency.

It is important to notice that, in certain situations, the angle spreading of signals in azimuth is much larger than elevation, or vise versa. Thus, it is important to make spatial/angular resolution of antenna-array match the realistic situation in terms of azimuth and elevation spreading. This can be accomplished by a virtual antenna-array consisting of a certain physical antenna array with a fixed number of antenna elements, while virtual antenna-array configurations thereof may be changed with the change of antenna mapping patterns.

Particularly, in a first aspect of the invention, a method of antenna array configuration for 3-Dimension beamforming in wireless network is provided, comprising: determining dynamically a mapping pattern for transforming a physical antenna array into a virtual antenna array based on time-varying downlink or uplink baseband channel statistics, from a set of candidate mapping patterns; and configuring the physical antenna array into different virtual antenna arrays according to the dynamically determined mapping pattern.

Additionally, the method further comprises making spatial or angular resolution of the virtual antenna array match the time-varying azimuth and elevation spreads of Degree of Departure (DoD) or Degree of Arrival (DoA) of signals to or from UEs involved.

Additionally, determining dynamically a mapping pattern further comprises: estimating channel status information from received signal samples of any uplink signals transmitted from UEs; calculating downlink beamforming matrices from the channel status information, and thus the estimated system performance corresponding to each candidate mapping pattern; and selecting the mapping pattern with a highest metric according to the estimated system performance.

Additionally, determining dynamically a mapping pattern is implemented periodically or on demand to dynamically configure the virtual antenna array.

Additionally, antenna reconfiguration and the baseband signal statistics are both associated with 3-Dimension beamforming.

Additionally, the physical antenna array comprises a number of fixed physical antenna elements, and the virtual antenna array is configured corresponding to the time-varying selected mapping pattern.

Additionally, the method further comprises carrying out tradeoff between resolutions of azimuth and elevation to adapt to time-varying angle spreads of signal propagation.

Additionally, the method further comprises mapping the physical antenna elements into certain number of virtual antenna arrays by weighted combining or switching by a RF circuit or a baseband dimension-reduction circuitry network.

Additionally, each candidate mapping pattern is represented by a mapping matrix reflecting mapping relationship between the physical antenna elements and the virtual antennas, $M_i$ (i=1, 2, ..., m, m is an assumed total number of the mapping patterns), with sizes of V rows by N columns, V representing the number of the virtual antennas and N representing the number of the physical antenna elements; and wherein each element of the mapping matrix $M_i$, comprises gain and phase information of the contribution of a physical antenna element to a respective virtual antenna; if the element of the mapping matrix $M_i$ equals 0, it represents no contribution is made by the physical antenna element to the respective virtual antenna; Otherwise, it represents contribution is made by the physical antenna element to the respective virtual antenna.

Additionally, the set of candidate mapping patterns is controlled to a feasible range of patterns for complexity-control purposes.

Additionally, the estimated system performance is reflected by statistics reflecting the estimated system performance, such as statistics of signal to leakage power radios (SLRs), and the mapping pattern (î) maximizing the statistics of SLRs is selected; mathematically, this selection is expressed by the following formula:

$$\hat{i} = \underset{i}{\mathrm{argmax}} E_t \left( \sum_{\{f,k\}} \log_2(\gamma^{[i]}(f, k)) \right)$$

where $\gamma^{[i]}$ (f,k) is defined as a signal to leakage power ratio at sub-carrier f, given UE k is scheduled and assigned by a base station to employ sub-carrier f;

$$\sum_{\{f,k\}}$$

stands for a summation over a full bandwidth;

$$E_t$$

denotes the statistical mean of samples during a period of t.

Additionally, the baseband channel statistics reflects UE's distribution variation which is embodied in variations of DoA or DoD spreads of elevations and azimuths from time to time.

In a second aspect of the invention, an apparatus of antenna array configuration for 3-Dimension beamforming in wireless network is provided, comprising:

a mapping pattern control unit configured to determine dynamically a mapping pattern for transforming a physical antenna array into a virtual antenna array based on time-varying downlink or uplink baseband channel statistics, from a set of candidate mapping patterns; and a mapping pattern execution unit configured to configure the physical antenna array as different virtual antenna arrays according to the dynamically determined mapping pattern.

Additionally, the apparatus is further configured to make spatial or angular resolution of the virtual antenna array adaptive to the time-varying azimuth and elevation spreads of Degree of Departure (DoD) or Degree of Arrival (DoA) of signals to or from UEs involved.

Additionally, the mapping pattern control unit further comprises:

an estimator, for estimating channel status information from received signal samples of any uplink signals transmitted from UEs;

a calculator, for calculating downlink beamforming matrices from the channel status information, and thus corresponding estimated system performance for each candidate mapping pattern; and a selector, for selecting the mapping pattern with a highest metric according to estimated system performance.

Additionally, the mapping pattern control unit is configured to implement the determining step periodically or on demand to dynamically configure the virtual antenna array.

Additionally, the apparatus is further configured to carry out tradeoff between resolutions of azimuth and elevation to adapt to time-varying angle spreads of signal propagation.

Additionally, the apparatus is further configured to map the physical antenna elements into certain number of virtual antenna arrays by weighted combining or switching by a RF circuit or a baseband dimension-reduction circuitry network.

In a third aspect of the invention, there is further provided an antenna array configured as different virtual antenna arrays to operate dynamically according to any method of the present invention.

In a fourth aspect of the invention, there is further provided a wireless base station system, comprising: an antenna control unit, configured to implement any method of the present invention; an interface unit, connected between the antenna control unit and an antenna array for information communications; and an antenna Array according to the present invention.

In a fifth aspect of the invention, there is further provided a computer program product comprising a set of computer executable instructions stored on a computer readable medium, configured to implement any of the methods according to the present invention.

Owing to the dynamic mapping pattern switching, the resulting virtual antenna array timely adapts to the UE distribution in 3-D world. Hence, the optimal resolution configuration of virtual antenna array is enabled along elevation and azimuth to achieve an optimal spatial BF effect, namely, to obtain the optimal average signal to interference ratio in the cell range or multiple cell scale. Therefore, average throughput enhancement for DL are expected.

BRIEF DESCRIPTION OF THE DRAWINGS

The features and advantages of the invention will be more apparent from the following exemplary embodiments of the invention with reference to the accompanied drawings, in which.

DETAILED DESCRIPTION

Embodiments of the invention will be described more fully hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

In this disclosure, the invention may be applied in various wireless networks, such as WCDMA, GSM, 3GPP LTE etc. Given the rapid development in communications, there will of course also be future type wireless communications technologies and systems with which the present invention may be embodied. It should not be seen as limiting the scope of the invention to only the aforementioned system.

It is also to be noted that, in the context of the present invention, the term "UE" is used to refer to a wireless terminal device in various wireless communication systems.

Figure 1:
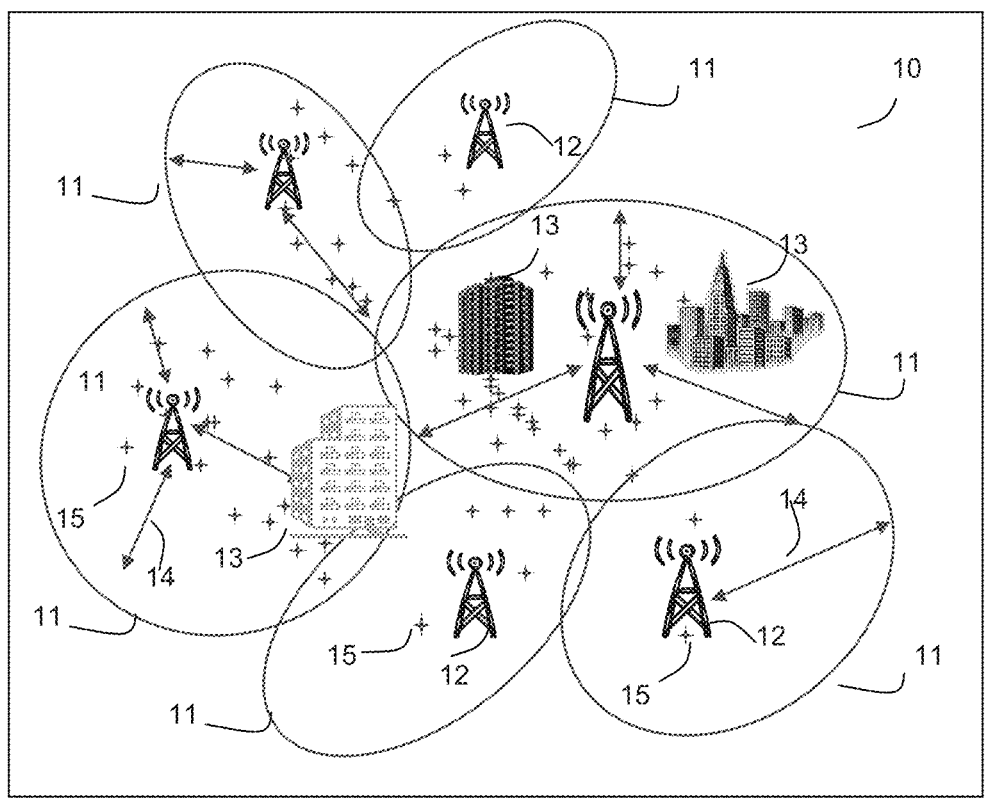
FIG. 1 illustrates a schematic diagram of UEs distribution in real world currently.
Figure 2:
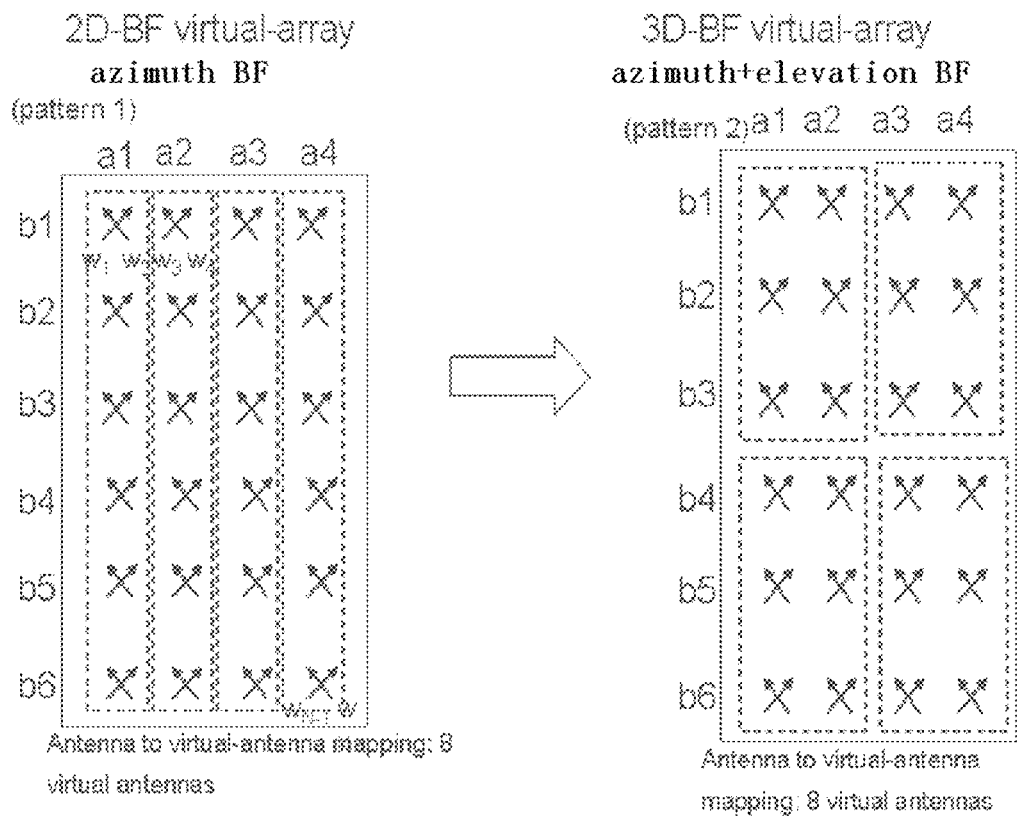
FIG. 2 illustrates exemplary mapping patterns for 2D-BF and 3D-BF virtual antenna array according to an embodiment of the present invention.

As illustrated in FIG. 2, a physical planar antenna array consists of a number of rows of antenna element pairs, each of which is cross-polarized. Multiple antenna elements enable the formed array to possess characteristics such as focusing the energy in a certain direction, low side-lobes, possibilities to steer (change) the patterns. As well, the transmission power efficiency requirement of a wireless base station such as, Base Station, NodeB, eNB may be easier to meet with a relative large antenna array. Therefore, the number of the antenna elements is large, and is larger than the dimension that data-detection/channel-estimation dominant baseband processing can support with a feasible complexity. Thus, it is necessary to map the physical antenna elements into certain number of virtual antennas by a certain weighted combining/switching by Radio Frequency (RF) circuits or a baseband dimension-reduction circuitry network.

The left part of FIG. 2 shows an exemplary virtual antenna array configuration pattern 1 for a 2D beamforming. According to the pattern 1, an exemplary physical antenna array of 6 rows (b1, b2 . . . b6) and 4 columns (a1, . . . a4) consisted of 48 antenna elements (indicated with w1, w2, w3, w4, . . . $w_{N-1}$, $w_N$ in FIG. 2, N=48 here), i.e., 24 antenna element pairs, is mapped into a virtual antenna array with 8 virtual antennas. Each physical antenna element pair is cross-polarized, i.e., each antenna element pair consists of 2 cross-polarized antenna elements. The 24 antenna element pairs are mapped into 4 groups as indicated by 4 dotted-line blocks; for example, one of the dotted-line block covers at the positions a1b1, a1b2, . . . a1b6. It is understood that each dotted-line block includes 2 virtual cross-polarized antennas. In the figure, "azimuth" indicates that this virtual antenna array has a capability to form a BF only in azimuth angle domain. The arrows denote different polarizations.

The right part of FIG. 2 shows an exemplary virtual antenna array configuration mapping pattern 2 for a 3D BF. As such, according to the pattern 2, the exemplary physical antenna array with 48 antenna elements is also mapped into 8 virtual antennas but the mapping pattern in which the antenna element pairs are mapped into the virtual antennas are different. In the figure "azimuth+elevation BF" indicates that this virtual antenna array has a capability to form a BF in both azimuth and elevation angle domain. The arrows denote different polarizations.

In the context, the terms "mapping pattern", "pattern" refer to a different virtual antenna array being formed by different antenna-element clustering described in the above. FIG. 2 illustrates two different patterns formed by different mapping relationship between the physical antenna-elements and the virtual antennas. As such, FIG. 3 illustrates another two patterns used in different UEs distribution scenarios.

Theoretically, there will be overall $C_N^V$ mapping patterns for a fixed physical antenna array, where V is the number of the virtual antenna and N is the number of the antenna element. For example, in FIG. 2, V equals to 8, and N equals to 48. It is to be understood that the physical antenna array, virtual antenna array, mapping pattern 1, mapping pattern 2, etc. are only illustrative, not for the purpose of limitation to the present invention. The physical antenna array can be any other type of antenna array in existing or future applications.

Figure 3:
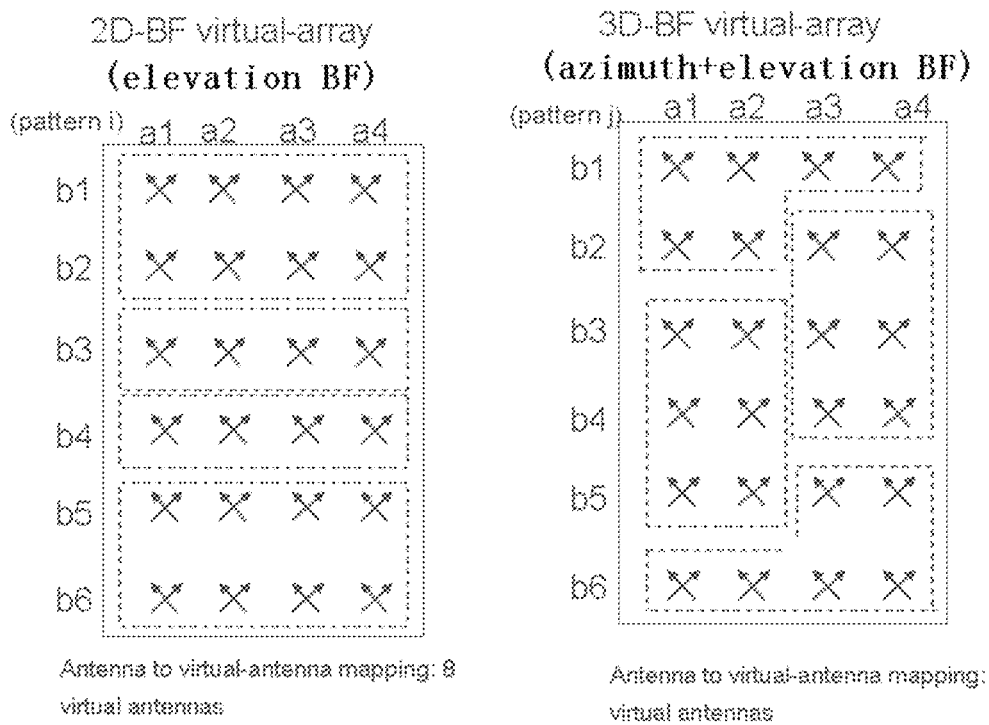
FIG. 3 illustrates exemplary for 2D-BF and 3D-BF virtual antenna array according to an embodiment of the present invention.

Similarly, FIG. 3 illustrates exemplary mapping patterns of virtual antenna array different from FIG. 2.

The left part of FIG. 3 shows a different exemplary mapping pattern i of 2D beamforming virtual antenna array. Similarly, the exemplary physical antenna array of 6 rows (b1, b2 . . . b6) and 4 columns (a1, . . . a4) consisted of 48 antenna elements (indicated with w1, w2, w3, w4, . . . $w_{N-1}$, $w_N$ in FIG. 2, N=48 here), i.e., 24 antenna element pairs, is mapped into a virtual antenna array with 8 virtual antennas. Each antenna element pair is cross-polarized, i.e., each antenna element pair consists of 2 cross-polarized antenna elements. The 24 antenna element pairs are mapped into 4 groups with 4 dotted-line blocks, for example, one of the dotted-line block covers the antenna element pairs at the positions a1b1, a2b1, a3b1, a4b1, a1b2, a2b2, a3b2, a4b2. It is understood that each dotted-line block includes 2 virtual cross-polarized antennas. In the figure, "elevation" indicates that this virtual antenna array has a capability to form a BF only in elevation azimuth angle domain.

The right part of FIG. 3 shows an exemplary mapping pattern j of 3D beamforming virtual antenna array. As such, according to the pattern j, the exemplary physical antenna array with 48 antenna elements is also mapped into 8 virtual antennas in the similar way, except that the mapping pattern in which the antenna element pairs are mapped into the virtual antennas are different.

These mapping patterns, for example, shown in FIGS. 2 and 3 above result in different relative placement relationship among the virtual antennas so that they actually change the spatial/angular resolution/radiation-pattern of the virtual antenna arrays. For instance, in FIG. 2, the mapping pattern 1 changing to pattern 2 makes the virtual antenna array change its type from 2D (e.g., only in azimuth domain) BF virtual antenna array into a 3D BF virtual antenna array which can form radio beams in both azimuth and elevation domains. The left pattern in FIG. 2 only enables the virtual antenna array to be able to form a 2D in azimuth dimension while the left pattern in FIG. 3 only enables the virtual antenna array to be able to form a 2D in elevation dimension.

It is also to be noted that, in a cellular wireless system, a particular mapping pattern may only yield optimal performance for a certain kind of UE distribution in a 3D landscape. Hence, it is necessary to adaptively change the mapping pattern when the UE distribution varies in time and in different sectors. By doing so, it helps to optimize the radio air-interface performance. As illustrated in FIG. 3, a virtual antenna array based on mapping pattern 'i' has a quite different capability from that with pattern 'j'. In other words, the same baseband algorithms may possess a quite different system performance while working with different virtual antenna arrays configured according to pattern 'i' or pattern 'j'.

Owing to the slow change of the UE location distribution, the change period of mapping pattern can be comparable to the coherent time of distribution change.

Mapped virtual antennas would be formed by different sets of physical antenna elements. There is no mapping overlap of elements between each virtual antenna.

Figure 4:
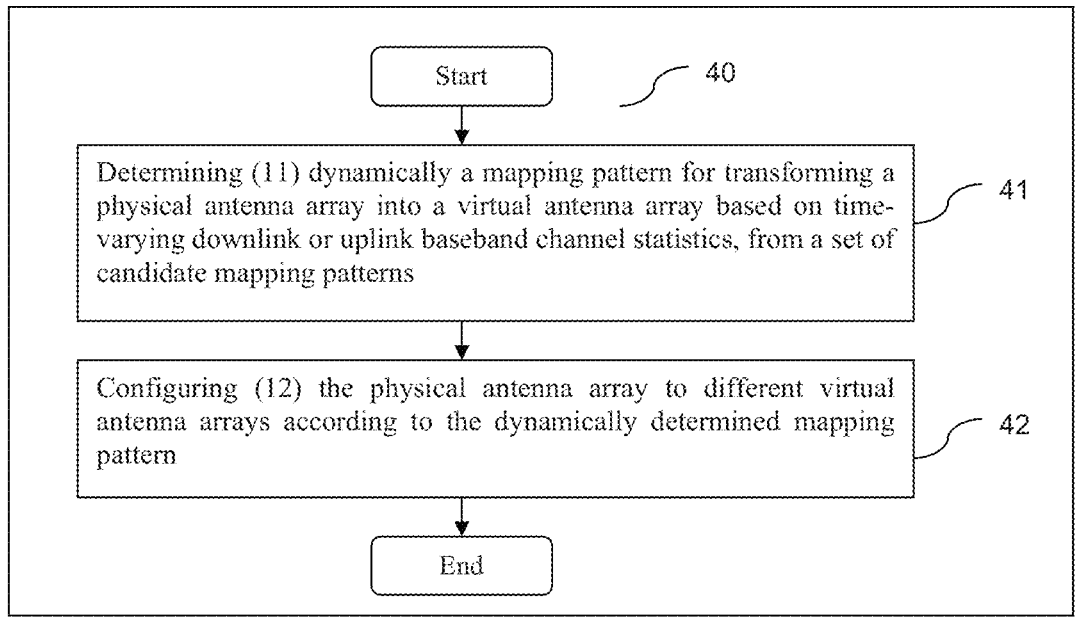
FIG. 4 illustrates a schematic flowchart of the method of antenna array configuration for 3-Dimension beamforming according to an embodiment of the present invention.

FIG. 4 illustrates a schematic flowchart of the method of antenna array configuration for 3-D beamforming according to an embodiment of the present invention. The method includes the following steps.

In step 41, a mapping pattern for transforming a physical antenna array into a virtual antenna array is determined dynamically based on time-varying downlink or uplink baseband channel statistics reflecting the estimated system performance, from a set of candidate mapping patterns.

The physical antenna array comprises a number of fixed physical antenna elements, and the virtual antenna array is configured corresponding to the time-varying mapping patterns.

In the further sense of the present invention, spatial or angular resolution of the virtual antenna array is enabled to adaptive to the time-varying azimuth and elevation spreads of Degree of Departure (DoD) or Degree of Arrival (DoA) of signals to or from UEs involved.

For the same number of virtual antennas, the tradeoff between the resolutions of azimuth and elevation was carried out according to time-varying angle spreads of signal propagation. An adaptive mapping pattern selection/determination criterion was formulated and detailed in following sections.

In step 42, the physical antenna array is configured as different virtual antenna arrays according to the dynamically determined mapping pattern.

It is understood that the above procedure may be implemented periodically or on demand to dynamically configure the virtual antenna array.

Figure 5:
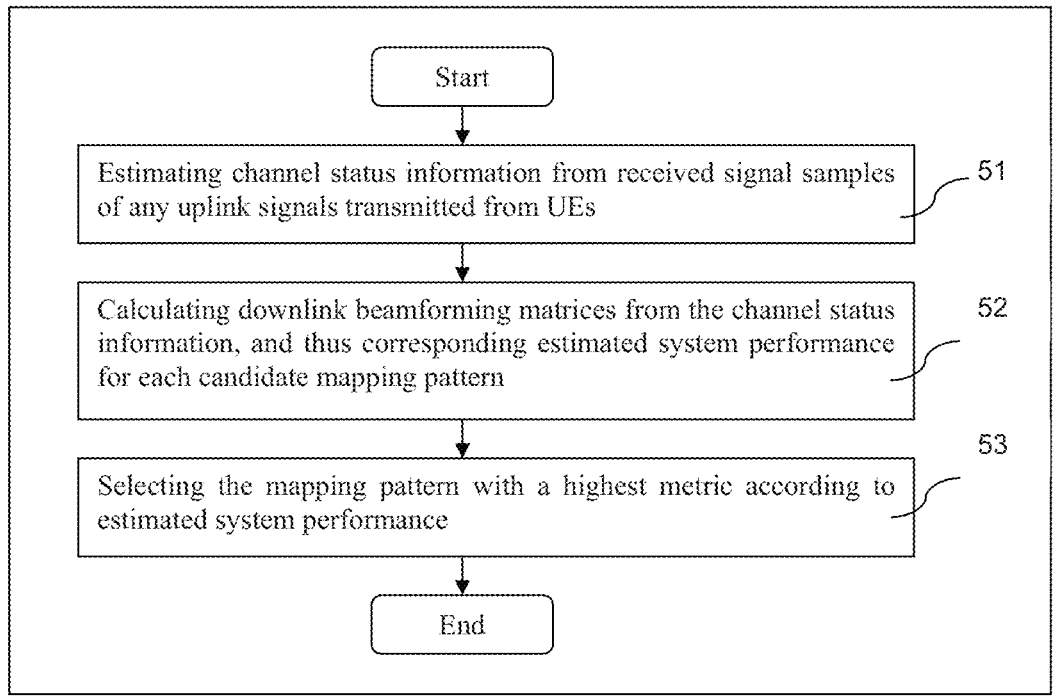
FIG. 5 illustrates a schematic flowchart of the determining step in the method of FIG. 4.

FIG. 5 shows the particular flowchart diagram of the determination step (41) in FIG. 4 which may include the following steps:

In step 51, channel status information is estimated based on received signal samples of any uplink signals transmitted from UEs.

In step 51, downlink BF matrices are calculated from the channel status information, and thus corresponding estimated system performance is calculated for each candidate mapping pattern.

In step 53, the mapping pattern with a highest metric is selected according to the estimated system performance.

Hereinafter, the mapping pattern determination criteria and control procedure may be described in details by considering the following rules:

From all the possible patterns, m candidate mapping patterns can be heuristically chosen as a connection pattern book to avoid unnecessary repetition of performance-equivalent patterns so as to remove the unnecessary complexity and cost. Thus, the number of candidate patterns can be controlled and minimized to be reasonable and feasible range.

Each candidate mapping pattern may be represented by a mapping matrix $M_i$, reflecting mapping relationship between the physical antenna elements and the virtual antennas. $M_i$ (i=1, 2, . . . , m, m is an assumed total number of the mapping patterns) is of the size of V rows by N columns, V representing the number of the virtual antennas and N representing the number of the physical antenna elements; and each element of the mapping matrix $M_i$ comprises gain and phase information of the contribution of a physical antenna element to a respective virtual antenna. If the element of the mapping matrix $M_i$ equals 0, it represents no contribution is made by the physical antenna element to the respective virtual antenna; Otherwise, it represents contribution made by the physical antenna element to the respective virtual antenna.

For example, the mapping matrixes $M_i$ may be expressed by the following form:

$$M_i = \begin{pmatrix} 0 & 0 & 0 & w_{ix} & & w_{ix} & & 0 & 0 & 0 \\ & & & & 0 & w_{ix} & w_{ix} & 0 & 0 & 0 & & w_{ix} \\ w_{ix} & w_{ix} & w_{ix} & & & & & 0 & 0 & w_{ix} \\ & & & & 0 & & 0 \\ & 0 & & & & & & 0 & & 0 \\ & & & & 0 \\ 0 & 0 & 0 & & & & & & w_{ix} & 0 & 0 & 0 \\ 0 \\ 0 & & 0 \\ 0 & 0 & & 0 & & & & & & 0 & w_{ix} & w_{ix} \end{pmatrix} \quad (1)$$

where parameters ($w_{ix}$) are weighting coefficients, which can be different values at different positions.

Each of columns of the mapping matrix may only has one non-zero element to ensure no overlap at mapping.

As an example, in FIG. 3, it is to be understood that this proposal does not necessarily recommend constraints such as same number of physical antenna elements, same elements' placement relationship mapped to a virtual antenna, etc. This diversity of the mapping patterns provides potential to cater to different needs of azimuth and elevation resolution tradeoff in the reality. The concrete design depends on system cost and performance tradeoff.

Coefficients ($w_{ix}$) normally are different complex values to meet coverage requirements by sophisticated calculation. However, typical values could be a heuristic setting. They may be constant values and realized by RF connection switch, or, otherwise baseband switch. Either works with this proposal and the concrete design can depend on different situations.

Mapping pattern switching and selection criterion, for instance, could be what follows, definitely, in order to improve overall system capacity, there might be other criterion similar to this one:

Periodically, in every time-duration during which most of locations of UEs are relatively stationary (It is referred to as a coherent time of UE distribution), mapping pattern 'i' is selected according to following criterion:

$$i = \underset{i}{\mathrm{argmax}} E_t\left(\sum_{\{f,k\}} \log_2(\gamma^{[i]}(f, k))\right) \quad (2)$$

i) where $\gamma^{[i]}(f,k)$ is defined as a signal to leakage ratio at sub-carrier f defined as follows given UE k is assumed to employ sub-carrier f. The larger the value it has, the better the performance of beamforming, the better resolution to separate the UEs spatially by the virtual antenna array configured by a corresponding virtual mapping pattern i; In other words, the pattern i which results in a maximum value $$E_t\left(\sum_{\{f,k\}} \log_2(\gamma^{[i]}(f,k))\right)$$

of the selection criterion (e.g., considering a baseband channel statistic) is chosen for virtual antenna mapping.

ii) where $$\sum_{\{f,k\}}$$

stands for a summation of log values of ratios over a full bandwidth. It is worth mentioning for possible Multi-user Multiple-Input Multiple-Output (MU-MIMO) scheme, there might be more than one UEs' downlink transmission (DL TX) sharing a same sub-carrier, so that, in such as a case, there should be more than one items for a certain sub-carrier in this summation. In contrast, for Single-User Multiple-Input Multiple-Output (SU-MIMO) schemes, only one item for a sub-carrier.

iii) where ratio $\gamma^{[i]}(f,k)$ is defined as follows:

$$\gamma^{[i]}(f,k) = \text{Det}\left[\frac{(H_{vir\_k,f}^{DL[i]} U_{f,k})^H (H_{vir\_k,f}^{DL[i]} U_{f,k})}{\sum_{\bar{k}}(H_{vir\_\bar{k},f}^{DL[i]} U_{f,k})^H (H_{vir\_\bar{k},f}^{DL[i]} U_{f,k})}\right] \quad (3)$$

where $H_{vir\_k,f}^{DL[i]} = (H_{vir\_k,f}^{UL[i]})^T = (M_i H_{k,f}^{UL})^T = H_{k,f}^{UL^T} M_i^T$ for time division duplex (TDD) systems is channel status information (CSI) from virtual antenna array in DL to $k^{th}$ UE in the DL, which can be estimated from the channel-estimation assisting uplink transmission (UL TX) signals (such as sounding reference signals) for sub-carrier 'f' and antenna mapping pattern 'i', owing to channel reciprocity. $H_{k,f}^{UL}$ is an UL CSI before mapping. It is noted that, in practice, it is not necessary to estimate it. Instead of it, CSI after mapping $H_{vir\_k,f}^{DL[i]}$ is estimated. For frequency division duplex (FDD) systems, channel reciprocity does not hold in a strict sense, however, its spatial features for uplink and downlink is similar and could be utilized in a similar fashion as demonstrated in this proposal for TDD cases.

iv) The $\bar{k}^{th}$ UE is to index one of those UEs that are neighboring sectors of $k^{th}$ UE and in co-channel. For MU MIMO scheme, $\bar{k}^{th}$ UE could be either an UE of same sector or one in other neighboring cells. For SU MIMO cases, $\bar{k}^{th}$ UE indexes only one of co-channel UEs in other serving sectors.

v) $H_{vir\_k,f}^{DL[i]}$ is of size of K by V, if K antennas are used for UL TX. Usually, base-stations have more antennas than UEs. Hence, this matrix is a 'short' matrix, which has fewer rows than columns.

vi) Det( ) is a determinant operator of linear algebra. Superscript H denotes the Hermitian transpose of the matrix.

vii) $U_f$ is a TX BF vector for sub-carrier 'f', it could be for a wideband or be frequency-selective.

viii)

$$E_t$$

denotes the statistical mean of samples during period t.

This criterion has a physical meaning of targeting on maximizing average signal to leakage power ratio (SLR) so as to enhance the cellular system capacity (in terms of both single cell and multiple-cell).

In other words, the higher SLR due to a certain antenna mapping pattern selected according to a certain UE distribution in a 3D landscape, which are reflected by the CSI between eNB and UEs, the better BF effect to the intended UEs, and the less interference to non-served UEs; The overall effects results in a higher cell spectrum efficiency so as to have a higher throughput for a certain bandwidth.

Though there is other possible criterion in a similar fashion, they are supposed to achieve almost the same performance.

It is remarkable that the existing baseband processing of 2D SU/MU BF algorithm based on linear algebra Eigen-signal analysis to calculate beamforming matrix $U_u$ can be directly adopted for 3D BF whenever certain 3D relevant pattern is selected, such as pattern 2 illustrated in FIG. 2.

Though the criterion is to explicitly maximize the DL system capacity, the UL system capacity is also expected to be enhanced simultaneously due to the channel reciprocity of the TDD.

The inventor of the present invention realized that, according to the solution of the present invention, a new leverage may be provided in further improvement of the air-interface design for wireless cellular network.

Figure 6:
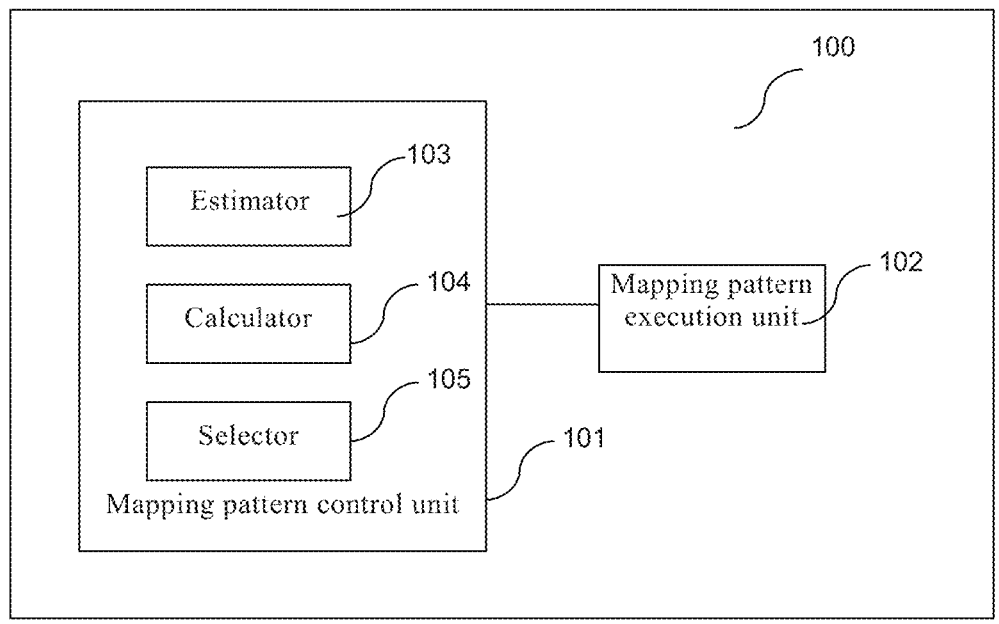
FIG. 6 illustrates a schematic diagram of the apparatus of antenna array configuration for 3-Dimension beamforming according to an embodiment of the present invention.

FIG. 6 illustrates a schematic diagram of the apparatus (100) of antenna array configuration for 3-Dimension beamforming according to an embodiment of the present invention.

The apparatus (100) includes a mapping pattern control unit (101) configured to determine dynamically a mapping pattern for transforming a physical antenna array into a virtual antenna array based on time-varying downlink or uplink baseband channel statistics, from a set of candidate mapping patterns; and a mapping pattern execution unit (102) configured to configure the physical antenna array as different virtual antenna arrays according to the dynamically determined mapping pattern.

The physical antenna array comprises a number of fixed physical antenna elements, and the virtual antenna array is configured corresponding to the time-varying mapping patterns.

The mapping pattern control unit (101) further includes an estimator (103) for estimating channel status information from received signal samples of any uplink signals transmitted from UEs; a calculator (104) for calculating downlink beamforming matrices from the channel status information, and thus corresponding estimated system performance for each candidate mapping pattern; and a selector (105) for selecting the mapping pattern with a highest metric according to estimated system performance.

In a further sense of the present invention, the apparatus is configured to make spatial or angular resolution of the virtual antenna array adaptive to the time-varying azimuth and elevation spreads of Degree of Departure (DoD) or Degree of Arrival (DoA) of signals to or from UEs involved.

As an example, the mapping pattern control unit (101) may be configured to perform the following operations.

1. Estimate the $H_{vir\_k,f}^{DL[i]}$ from the received signal samples of UL signals from transmitted from UE, such as UL data or control channel signals.

2. Calculate the DL BF matrix $U_{f,k}$ for each of the serving UE k according the BF technique adopted and CSI $H_{vir\_k,f}^{DL[i]}$; BF technique could be any conventional ones employed by the eNB, such as eigen BF, or zero-forcing BF, etc;

3. Calculate $\gamma^{[i]}$ (f,k) for each pattern i at occasions when the $U_{f,k}$ and $H_{vir\_k,f}^{DL[i]}$ are available;

4. Perform the statistics of $$\phi(i) = E_t\left(\sum_{\{f,k\}} \log_2(\gamma^{[i]}(f,k))\right)$$

and compare the values $\phi(i)$, i=1, 2, ... m and identify the index i which corresponds to the highest value of $\phi(i)$;

5. Inform the mapping pattern execution unit (102) of selected the pattern index i to carry out the antenna mapping by using the mapping matrix $M_i$;

The above actions may be repeated from time to time periodically or on demand to instruct to dynamically configure the planar physical antenna array into different virtual antenna array.

It is to be understood that the relevant formula, expressions or meaning thereof described herein may refer to the previous description in the present invention. Further, the relevant rules for mapping pattern determination or switching may be appropriately applied to all the method, apparatus and system.

Figure 7:
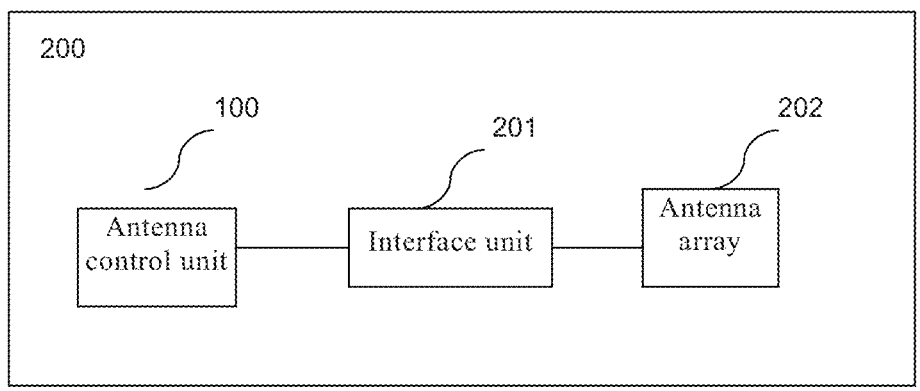
FIG. 7 illustrates a schematic diagram of the system of antenna array configuration for 3-Dimension beamforming according to an embodiment of the present invention.

FIG. 7 illustrates a schematic diagram of the system (200) of antenna array configuration for 3-D BF according to an embodiment of the present invention.

The wireless base station system (200) may include an antenna control unit (100) configured to implement the present invention; an interface unit (201) connected between the antenna control unit and an antenna array for information communications; and an antenna array (202) adapted to the present invention.

The antenna control unit (100) may be preferably located inside a wireless base station, such as eNB, and work in relationship to functions inside eNB.

As an embodiment of the invention, there is further provided a computer program product comprising a set of computer executable instructions stored on a computer readable medium, configured to implement any of the methods according to the present invention.

It is to be noted that the features set forth in the methods of the embodiments may correspondingly be applied to the apparatuses, systems, or the computer program products of the invention. Thus, herein other similar features will not be described again.

It is known that as an extension of azimuth BF (2D BF), 3D BF potentially has advantages over the existing 2D BF at situations where elevation degrees of signal multi-path are so diverse that they could be utilized for a 3D BF. Nowadays, 3D-BF emerges as one of most promising technique in the sense that it could better capture or synthesize the spatial signature of signals. This feature enables a better configuration to UE geographical distribution variation from time to time and from one cell to another cell. The proposal described within this document is a candidate solution for adaptive 3D BF.

In summary, a fixed physical antenna array is transformed into dynamic virtual antenna arrays by mapping pattern switching for adaptive 3D/2D BF. It is possible to adopt 2D-compatible eigen-analysis based baseband BF algorithm for a 3D BF. It is worth mentioning it is also allowable to have antenna-array specific algorithms, which are different in 2D BF and 3D BF.

According to the embodiments of the invention, the optimal resolution configuration of virtual antenna array is enabled along elevation and azimuth to achieve an optimal spatial BF effect, namely, to obtain the optimal average signal to interference ratio in the cell range or multiple cell scale. Therefore, average throughput enhancement for DL is achieved.

Further, it is compatible with the existing DL algorithm based on Eigen-signal analysis. The processing is in a dimension scale of virtual antenna number. Thus, feasible computation complexity (proportional to an assumed total number of the mapping patterns, m) is incurred during UL transmission slot for pattern selection decision.

UE's distribution variation, specifically, variations of DoA spreading of elevations and azimuths is exploited from sector to sector and from time to time; and the existing 8-Tx antenna is a planar antenna array (as shown in pattern 1 of FIG. 2) and could be utilized with some modification.

The embodiments emphasize that configuration of electrical characteristics of antenna array might be an influential aspect in cellular MIMO TX design besides the data detection/transmission baseband processing. Research in multiple-antenna and MIMO needs pay more attention to the joint antennas and algorithm design rather than only focuses on them separately.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the description do not imply any specific order in which the features/steps must be worked. Rather, the steps/features may be performed in any suitable order.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and/or functionally distributed between different units and processors.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "comprising", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A method of dynamically configuring an antenna array in a wireless network, comprising:

dynamically determining a mapping pattern for transforming a physical antenna array into a virtual antenna array based on time-varying downlink or uplink baseband channel statistics, from a set of candidate mapping patterns, wherein the virtual antenna array is a cluster of elements of the physical antenna array formed to achieve a dynamic three dimensional beamforming from the set of candidate mapping patterns, wherein the determining further comprises:

estimating channel status information from received signal samples of any uplink signals transmitted from user equipment;

calculating downlink beamforming matrices from the channel status information, and estimating system performance for each candidate mapping pattern;

selecting the mapping pattern having a highest metric according to the estimated system performance;

configuring the physical antenna array to form different virtual antenna arrays according to the dynamically determined mapping pattern.

2. The method of claim 1 further comprising:

making spatial or angular resolution of the virtual antenna array responsive to time-varying azimuth and elevation spreads of Degree of Departure (DoD) or Degree of Arrival (DoA) of signals to or from involved user equipment.

3. The method of claim 2 further comprising:

carrying out tradeoff between resolutions of azimuth and elevation to adapt to time-varying angle spreads of signal propagation.

4. The method of claim 1 wherein the determining is performed periodically or on demand to dynamically configure the virtual antenna array.

5. The method of claim 1:

wherein each candidate mapping pattern is represented by a mapping matrix reflecting a mapping relationship between the physical antenna elements and the virtual antennas;

wherein each element of the mapping matrix comprises gain and phase information of the contribution of a physical antenna element to a respective virtual antenna;

wherein an element of the mapping matrix having a value of zero indicates that no contribution is made by the physical antenna element to the respective virtual antenna;

wherein an element of the mapping matrix having a non-zero value indicates that a contribution is made by the physical antenna element to the respective virtual antenna.

6. The method of claim 5 wherein the estimated system performance is reflected by statistics of signal-to-leakage power ratios (SLRs), and the mapping pattern ($\hat{i}$) maximizing the statistics of SLRs is selected according to the following formula:

$$\hat{i} = \operatorname*{argmax}_{i} E_t \left( \sum_{(f,k)} \log_2(\gamma^{[i]}(f,k,)) \right)$$

where $\gamma^{[i](f,k)}$ is defined as a signal to leakage power ratio at sub-carrier f, a given user equipment k is assumed to employ sub-carrier f;

$$\sum_{(f,k)}$$

denotes a summation over a full bandwidth; and $$E_t$$

denotes the statistical mean of samples during a period of t.

7. The method of claim 1 wherein antenna configuration and the baseband signal statistics are both associated with 3-Dimensional beamforming.

8. The method of claim 1 wherein the physical antenna array comprises a number of fixed physical antenna elements, and wherein the virtual antenna array is configured to correspond to the candidate mapping patterns.

9. The method of claim 8 further comprising:

mapping the physical antenna elements into a number of virtual antenna arrays by weighted combining, or switching by a RF circuit or a baseband dimension-reduction circuitry network.

10. The method of claim 1 wherein the set of candidate mapping patterns is limited to a defined range of patterns.

11. The method of claim 1 wherein the baseband channel statistics reflects user equipment distribution variations which are embodied in variations of Degree of Arrival (DoA) or Degree of Departure (DoD) spreads of elevations and azimuths.

12. The method of claim 1, wherein the set of candidate mapping patterns comprises mapping patterns of 2-Dimensional beamforming virtual antenna arrays and mapping patterns of 3-Dimensional beamforming virtual antenna arrays; and wherein configuring the physical antenna array comprises configuring to form different 3-Dimensional beamforming virtual antenna arrays according to the dynamically determined mapping pattern.

13. An apparatus operative to reconfigure antenna arrays in a wireless network, comprising:

a mapping pattern control circuit configured to dynamically determine a mapping pattern for transforming a physical antenna array into a virtual antenna array based on time-varying downlink or uplink baseband channel statistics, from a set of candidate mapping patterns, wherein the virtual antenna array is a cluster of elements of the physical antenna array formed to achieve a dynamic three dimensional beamforming from the set of candidate mapping patterns, wherein the mapping pattern control circuit further comprises:

an estimator circuit configured to estimate channel status information from received signal samples of any uplink signals transmitted from user equipment;

a calculator circuit configured to calculate downlink beamforming matrices from the channel status information, and estimating system performance for each candidate mapping pattern;

a selector circuit configured to select the mapping pattern having a highest metric according to the estimated system performance;

a mapping pattern execution circuit configured to form different virtual antenna arrays from the physical antenna array according to the determined mapping pattern.

14. The apparatus of claim 13 wherein the apparatus is configured to make spatial or angular resolution of the virtual antenna array responsive to time-varying azimuth and elevation spreads of Degree of Departure (DoD) or Degree of Arrival (DoA) of signals to or from involved user equipment.

15. The apparatus of claim 14 wherein the apparatus is further configured to carry out tradeoff between resolutions of azimuth and elevation to adapt to time-varying angle spreads of signal propagation.

16. The apparatus of claim 13:
wherein each candidate mapping pattern is represented by a mapping matrix reflecting a mapping relationship between the physical antenna elements and the virtual antennas;
wherein each element of the mapping matrix comprises gain and phase information of the contribution of a physical antenna element to a respective virtual antenna;
wherein an element of the mapping matrix having a value of zero indicates that no contribution is made by the physical antenna element to the respective virtual antenna;
wherein an element of the mapping matrix having a non-zero value indicates that a contribution is made by the physical antenna element to the respective virtual antenna.

17. The apparatus of claim 16 wherein the estimated system performance is reflected by statistics of signal-to-leakage power ratios (SLRs), and the mapping pattern ($\hat{i}$) maximizing the statistics of SLRs is selected according to the following formula:

$$\hat{i} = \underset{i}{\mathrm{argmax}} E_t \left( \sum_{\{f,k\}} \log_2(\gamma^{[i]}(f, k,)) \right)$$

where $\gamma^{[i](f,k)}$ is defined as a signal to leakage power ratio at sub-carrier f, a given user equipment k is assumed to employ sub-carrier f;

$$\sum_{\{f,k\}}$$

denotes a summation over a full bandwidth; and $$E_t$$

denotes the statistical mean of samples during a period of t.

18. The apparatus of claim 13 wherein the mapping pattern control circuit is further configured to perform the determining step periodically or on demand to dynamically configure the virtual antenna array.

19. The apparatus of claim 13 wherein antenna configuration and the baseband signal statistics are both associated with 3-Dimensional beamforming.

20. The apparatus of claim 13 wherein the physical antenna array comprises a number of fixed physical antenna elements, and wherein the virtual antenna array is configured to correspond to the candidate mapping patterns.

21. The apparatus of claim 20 wherein the apparatus is further configured to map the physical antenna elements into a number of virtual antenna arrays by weighted combining, or switching by a RF circuit or a baseband dimension-reduction circuitry network.

22. The apparatus of claim 13 wherein the set of candidate mapping patterns is limited to a defined range of patterns.

23. The apparatus of claim 13 wherein the baseband channel statistics reflects user equipment distribution variations which are embodied in variations of Degree of Arrival (DoA) or Degree of Departure (DoD) spreads of elevations and azimuths from time to time.

24. The method of claim 13,
wherein the set of candidate mapping patterns comprises mapping patterns of 2-Dimensional beamforming virtual antenna arrays and mapping patterns of 3-Dimensional beamforming virtual antenna arrays; and
wherein the mapping pattern execution circuit is configured to form different 3-Dimensional beamforming virtual antenna arrays from the physical antenna array according to the determined mapping pattern.

25. A base station system operative to support communications in a wireless network, comprising:
an antenna control circuit, configured to:
dynamically determine a mapping pattern for transforming a physical antenna array into a virtual antenna array based on time-varying downlink or uplink baseband channel statistics, from a set of candidate mapping patterns, wherein the virtual antenna array is a cluster of elements of the physical antenna array formed to achieve a dynamic three dimensional beamforming from the set of candidate mapping patterns, wherein the determining further comprises:
estimating channel status information from received signal samples of any uplink signals transmitted from user equipment;
calculating downlink beamforming matrices from the channel status information, and estimating system performance for each candidate mapping pattern;
selecting the mapping pattern having a highest metric according to the estimated system performance;
configure the physical antenna array to form different virtual antenna arrays according to the dynamically determined mapping pattern;
a physical antenna array configurable as different virtual antennas for 3-Dimensional beamforming in the wireless network;
an interface circuit, connected between the antenna control circuit and the antenna array for information communications.

26. A computer program product stored in a non-transitory computer-readable medium, said computer program product comprising program instructions for dynamically configuring an antenna array in a wireless network, wherein the computer program instructions, when run on a network node, configure the network node to:
dynamically determine a mapping pattern for transforming a physical antenna array into a virtual antenna array based on time-varying downlink or uplink baseband channel statistics, from a set of candidate mapping patterns, wherein the virtual antenna array is a cluster of elements of the physical antenna array formed to achieve a dynamic three dimensional beamforming from the set of candidate mapping patterns, wherein the determining further comprises:
estimating channel status information from received signal samples of any uplink signals transmitted from user equipment;
calculating downlink beamforming matrices from the channel status information, and estimating system performance for each candidate mapping pattern;

selecting the mapping pattern having a highest metric according to the estimated system performance;
configure the physical antenna array to form different virtual antenna arrays according to the dynamically determined mapping pattern.

* * * * *